Nov. 12, 1929.  J. H. SMITH  1,735,799
SAFETY CLUTCH
Filed May 9, 1927   2 Sheets-Sheet 1
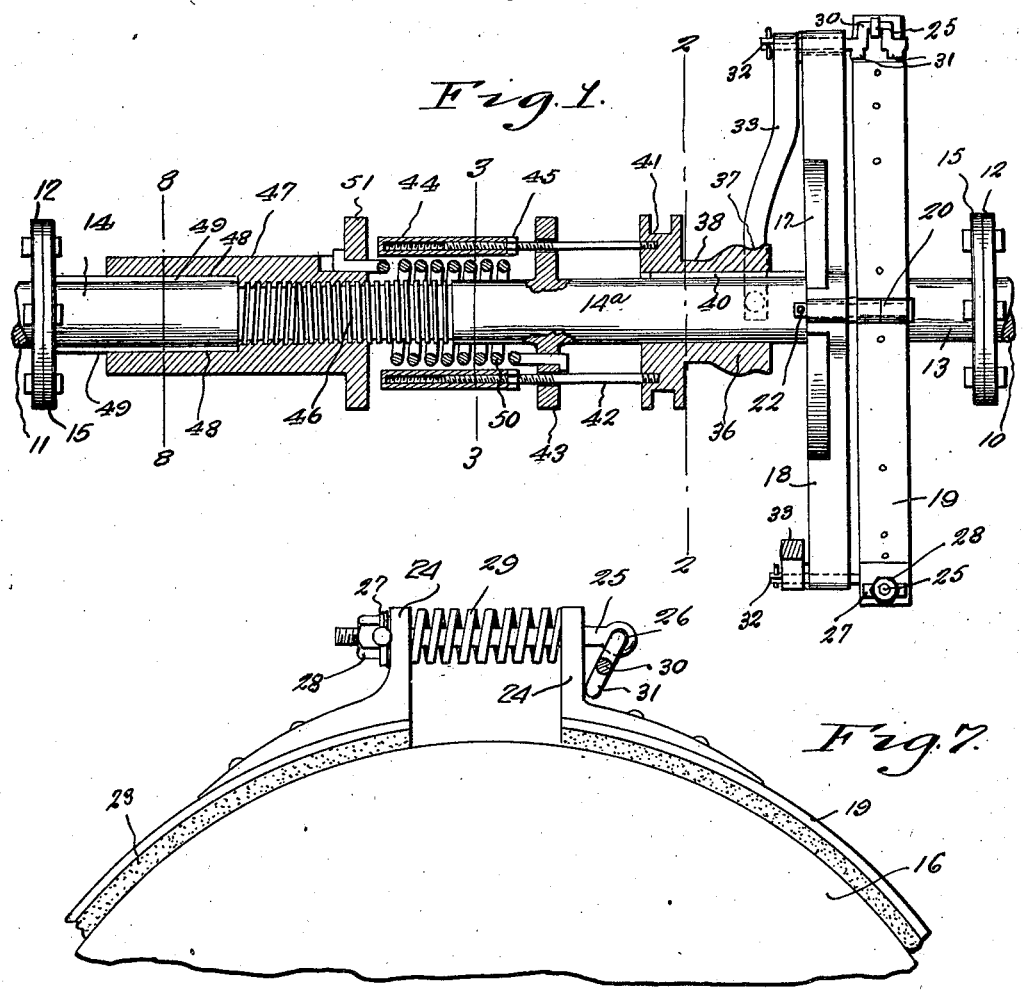
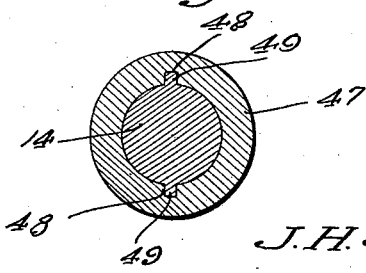
J. H. Smith INVENTOR Nov. 12, 1929.  J. H. SMITH  1,735,799
SAFETY CLUTCH
Filed May 9, 1927  2 Sheets-Sheet 2
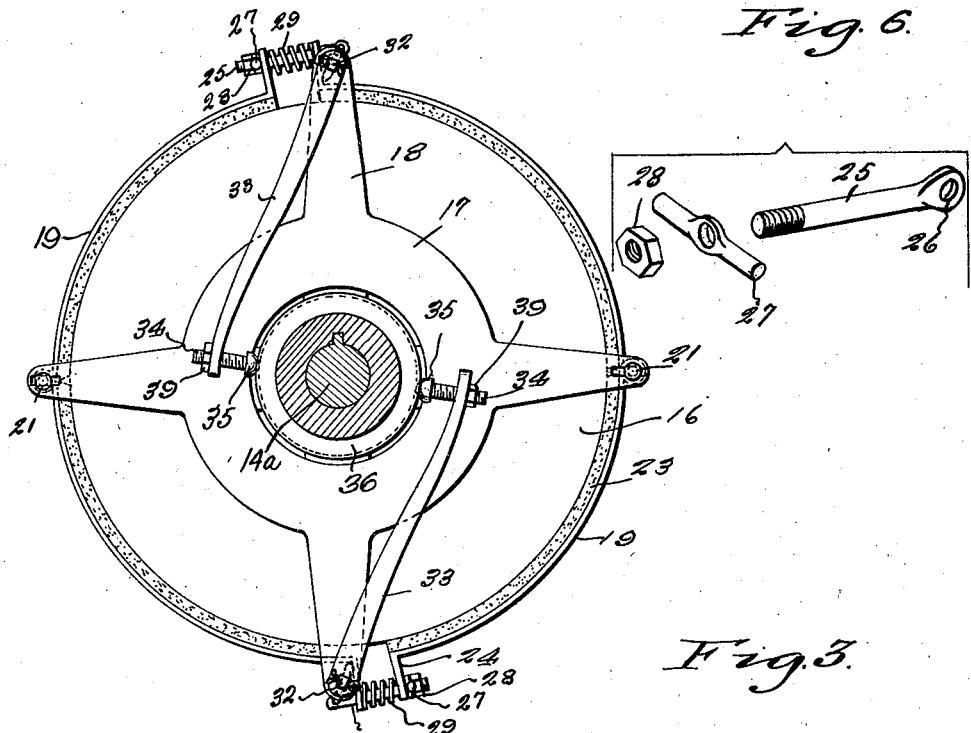
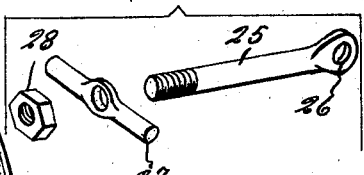
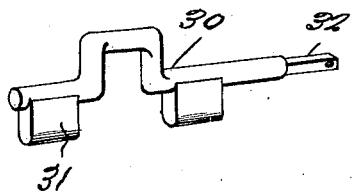
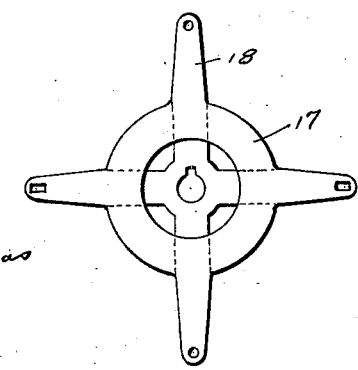
J. H. Smith INVENTOR Patented Nov. 12, 1929

1,735,799

UNITED STATES PATENT OFFICE

JOHN HOLMAN SMITH, OF LULING, TEXAS

SAFETY CLUTCH

Application filed May 9, 1927. Serial No. 190,108.

This invention relates to improvements in safety devices for power driven machines, an object of the invention being to provide means for coupling a drive shaft with a driven shaft in such a manner that an excessive load upon the driven shaft will cause the latter to be automatically released, and thus prevent damage to any of the machinery, as well as possible injury to the workman.

To this end, the invention provides a drive and driven shaft connecting means which includes a normally engaged clutch and means controlled by the load upon the driven shaft to operate the clutch and release said driven shaft.

Another object of the invention is the provision of means to adjust the clutch releasing means so as to regulate the release of the driven shaft.

With the above and other objects in view, the invention further includes the following novel features and details of construction, to be hereinafter more fully described, illustrated in the accompanying drawings and pointed out in the appended claims.

In the drawings:—

Figure 1 is a view partly in section and partly in elevation showing the invention.

Figure 2 is a section taken substantially on the line 2—2 of Figure 1.

Figure 3 is an enlarged sectional view on the line 3—3 of Figure 1.

Figure 4 is a detail perspective view of the crank shaft.

Figure 5 is a detail view of the spider.

Figure 6 is a detail perspective view of the clutch band pin and associated parts.

Figure 7 is an enlarged fragmentary elevation showing a portion of the clutch band and clutch drum.

Figure 8 is a section on the line 8—8 of Figure 1.

Referring to the drawings in detail wherein like characters of reference denote corresponding parts, the reference character 10 indicates a portion of a drive shaft and 11 a portion of a driven shaft, each of which is provided with a collar 12 or other suitable means for attachment to the coupling means which constitute the present invention.

This coupling means comprises a drive shaft section 13 and driven shaft sections 14 and 14$^a$ the sections 13 and 14 being provided with collars 15 for connection with the collars 12. The shafts 10 and 11 are thus rigidly connected with the shaft sections 13 and 14 respectively.

Secured upon the end of the shaft section 13 is a drum 16 while fast upon the adjacent end of the shaft section 14$^a$ is a spider 17 which includes radially extending arms 18. The spider 17 carries a band which is formed of separate sections 19. The band sections are hingedly connected as indicated at 20 and the pins 21 of these connections extend through the outer ends of certain of the arms 18 of the spider and are suitably secured in place by pins 22. The band is provided with a suitable lining 23.

One end of each of the band sections 19 is provided with an apertured ear 24 through which passes a pin 25. This pin is provided at one end with an eye 26 and its opposite end passes through an eye provided in a bar 27 while a nut 28 serves to hold the parts in position. A spring 29 surrounds each of the pins 25. Extending through the eye 26 of each of the pins 25 is a crank shaft 30. This shaft carries spaced cams 31 which are adapted to engage one of the apertured ears 24. One end of this shaft is square as shown at 32 and has secured thereon one end of an arm 33. The opposite end of this arm carries a threaded pin 34 which is provided with a head 35 and this head is adapted to bear against a cam 36, the latter being provided with a high portion 37 and a low portion 38. The pin 34 is adjustable within the arm 33 and is held in adjusted position by a nut 39.

The cam 36 is splined upon the shaft section 14$^a$ as indicated at 40 and carries a grooved collar 41. This collar is adapted to be engaged by a forked lever or ordinary construction (not shown), by means of which the cam may be manually shifted longitudinally of the shaft. Extending from the cam and parallel with the shaft section 14$^a$ are rods 42. These rods pass through a guide 43 which is carried by the shaft section 14$^a$ and have their outer ends threaded to receive internally threaded sleeves 44. These sleeves form extensions of the rods 42 and provide means whereby the lengths of these rods may be adjusted. Jamb nuts 45 serve to hold the sleeves in adjusted position.

The outer end of the shaft section 14ª is threaded as shown at 46 and this threaded end engages one end of an internally threaded sleeve 47. The opposite end of this sleeve is longitudinally grooved as shown at 48 to accommodate longitudinally extending ribs 49 carried by the shaft section 14. The sleeve 47 is thus splined upon the shaft section 14 so as to permit of relative longitudinal movement.

Surrounding the shaft section 14ª is a coiled spring 50 which has one of its ends secured to the guide 43 rigid with said section and its opposite end secured to one end of the sleeve 47, this end of the sleeve being provided with a flange 51.

The invention is designed for the purpose of connecting drive and driven shafts of any character and to automatically release the driven shaft in the event of an overload upon said shaft. For example, assuming that the invention was used for the purpose of connecting a lathe with a source of power, should the tool of the workman dig into the work a sufficient depth to offer increased resistance to the operation of the lathe, instead of breaking some part of the machinery or tool and possibly ruining the work or injuring the workman, the operation of the lathe will be automatically stopped. This is due to the fact that when resistance is offered to the driven shaft, the sleeve 47 will travel in the direction of the rods 42 and when the flange 51 of the sleeve engages the extensions 44 of these rods, the cam 36 will be moved longitudinally of the shaft section 14ª in the direction of the drum. Normally the heads 35 at the inner ends of the arms 33 will ride upon the high part 37 of the cam 36, and the torque load from the shaft section 14ª to the shaft section 14 will be transmitted through the spring 50. An overload upon the shaft section 14 will cause said spring to yield, whereupon the sleeve 47 will travel along the threaded end 46 of the shaft section 14ª until the sleeve engages the extensions 44. Continued movement of the sleeve will move the cam 36 toward the drum, so that the heads 35 will ride upon the low part of the cam and permit the springs 29 to expand the band and release the drum. When the driven shaft has been relieved of its overload, the band may be again engaged with the drum through the manual operation of the cam 36.

The invention is susceptible of various changes in its form, proportions and minor details of construction and the right is herein reserved to make such changes as properly fall within the scope of the appended claims.

Having described the invention what is claimed is:—

1. In a clutch, a drive shaft, a driven shaft, a drum secured to one of the shafts, spaced aligned relatively movable shaft sections, means securing one of the shaft sections to the other shaft, a spring influenced band surrounding and normally engaged with the drum, arms fast upon and extending from one of the relatively movable shaft sections, means connecting said arms and band to actuate and support the latter in disengaged position, actuating levers connected with the arms, a cam slidable upon one of the relatively movable shaft sections for engagement by the arms to control the band, movable means connecting the relatively movable shaft sections, means controlled by the load upon the driven shaft to operate the shaft section connecting means, and means located in the path of movement of said shaft section connecting means and connected with the cam to actuate the latter.

2. In a clutch, a drive shaft, a driven shaft, a drum secured to one of the shafts, spaced aligned relatively movable shaft sections, means securing one of the shaft sections to the other shaft, a spring influenced band surrounding and normally engaged with the drum, arms fast upon and extending from one of the relatively movable shaft sections, means connecting said arms and band to actuate and support the latter in disengaged position, actuating levers connected with the arms, a cam slidable upon one of the relatively movable shaft sections for engagement by the arms to control the band, movable means connecting the relatively movable shaft sections, means controlled by the load upon the driven shaft to operate the shaft section connecting means, and longitudinally adjustable members secured to the cam and located in the path of movement of the shaft section connecting means to actuate the cam.

In testimony whereof I affix my signature.

JOHN HOLMAN SMITH.